Dec. 3, 1940. T. W. MULLEN 2,223,636
VALVE
Filed Sept. 11, 1939
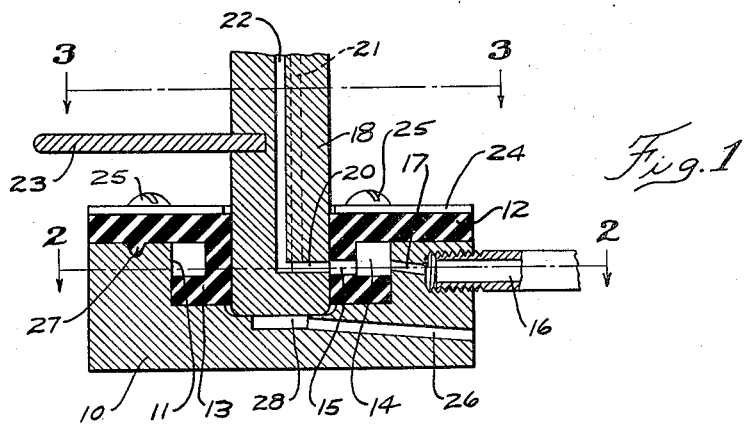
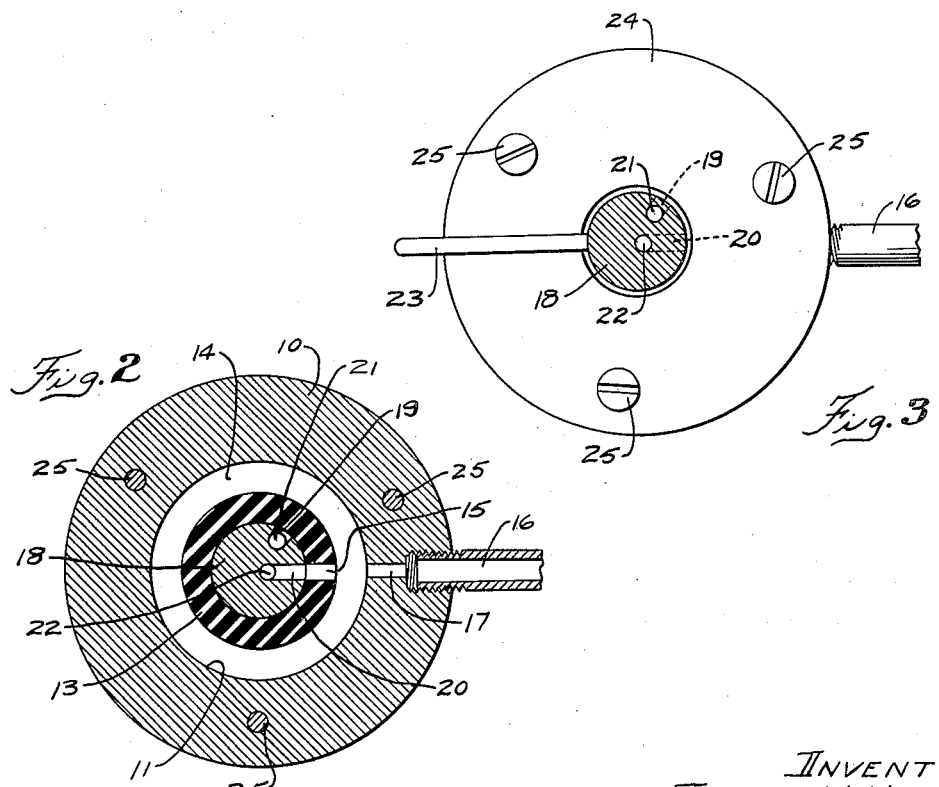
INVENTOR
THOMAS W. MULLEN,
BY Minturn & Minturn
ATTORNEYS Patented Dec. 3, 1940

2,223,636

UNITED STATES PATENT OFFICE 2,223,636

VALVE

Thomas W. Mullen, Indianapolis, Ind., assignor to Bowes Seal Fast Corporation, Indianapolis, Ind., a corporation of Indiana Application September 11, 1939, Serial No. 294,228

4 Claims. (Cl. 251—113)

This invention relates to a valve structure self-sealing in nature and eliminating any possibility of end pressure on the rotating member which controls flows. Furthermore the invention permits some flexibility in the machinery and aligning of the valve shifting member so that accurate fitting of that member with the stationary part is not required.

These and other objects and advantages of the invention will become apparent to those versed in the art in the following description of one particular form of the invention as illustrated in the accompanying drawing, in which Fig. 1 is a central vertical section through a structure embodying the invention;

Fig. 2, a transverse section on the line 2—2 in Fig. 1; and

Fig. 3, a transverse section on the line 3—3 in Fig. 1.

Like characters of reference indicate like parts throughout the several views in the drawing.

The invention may assume any number of forms, and the particular form herein shown and described is not to be considered as limiting the invention thereto but only as one particular embodiment thereof for the purpose of illustration.

A body 10, herein shown as being metallic and as consisting essentially of a short cylindrical length, has a bore 11 entering therein from an end. An elastic disc 12 is seated over the end of the body 10 and integrally carries a depending portion 13 cylindrical in shape to fit slidingly within the bore 11 and to rest against the lower end of the bore. A groove 14 is formed circumferentially around the projection 13 immediately under the disc 12. A radial passageway 15 extends through the projection 13 to provide communication from this groove 14 and an axial bore through the disc 12 and its projection 13.

The body 10 receives a fluid conducting pipe 16 from which leads a passageway 17 to discharge into the groove 14.

A rotatable valve member 18 in the nature of a plug, in the form herein shown, has a cylindrical shape to fit slidingly within the central bore through the disc 12 and its projection 13 and bear axially against the lower end of the bore of the body 10. This member 18 has a plurality of laterally opening passageways, herein shown as two in number, indicated by the numerals 19 and 20. These lateral passageways 19 and 20 communicate with passageways 21 and 22, respectively, extending along through the member 18 to discharge at any suitable position.

The member 18 is made to be rotatable about its own axis by any suitable means, one such means being a lever 23. By selective rotation of the member 18, the passageways 19 and 20 may be selectively registered with the passageway 15 thereby giving selective flows of fluid from the line 16 through the member 18.

Whatever the fluid may be, the pressure thereof as supplied to the line 16 will force the projection 13 into a close fit circumferentially around the member 18 and will also tend to urge the lower part of the projection 13 downwardly against the floor of the bore 11 in the body 10. The disc 12 is retained compressively against the upper end of the body 10 by any suitable means, such as by the metallic plate 24 secured thereto by screws 25. Thus while the member 18 may fit initially rather freely within the bore through the disc 12 and its projecting part 13, a fluid-tight fit is thereafter produced by reason of the pressure exerted by the fluid itself. Should by any chance there be a leakage of the fluid, particularly to the lower end of the member 18, such leakage is collected in a pocket 28 and conducted away therefrom through a passageway 26 discharging externally of the body 10. Preferably the disc 12 is located in a predetermined position in reference to the body 10 by any suitable means, such as by a small boss 27 serving as a pilot and entering into a depression provided in the upper face of the body 10. This gives a fixed location in reference to the body 10 of the passageway 15 so that the member 18 may be located and shifted in accordance therewith.

The disc 12 and its projection 13 are preferably made out of a synthetic rubber that does not deteriorate in the presence of air, and lubricating oils and greases, but retains its elasticity in the presence thereof. Drawing down on the screws 25 serves to compress the elastic member within the bore 11 tending to expand the projection laterally against the member 18.

While I have herein shown and described my invention in the one best form as now known to me, it is obvious that structural changes may be made without departing from the spirit of the invention and I, therefore, do not desire to be limited to that precise form beyond the limitations as may be imposed by the following claims.

I claim:

1. A valve comprising a rigid cup, a rubber-like plug fitted in the cup and having a groove therearound opening toward the circumferential wall of the cup forming an annular chamber around the plug bounded by flexible upper and lower lips, an inner flexible wall and an outer cup wall, said plug having a bore therethrough and a lateral passageway from said chamber opening into said bore, said cup having a passageway opening into said chamber, an axially rotatable stem slidingly entered in said bore, said stem having a peripheral orifice selectively registrable with said plug opening, and means restraining said upper lip against travel outwardly from said cup, whereby pressure of fluid entering through said cup passageway tends to press said flexible inner wall into sealing contact with said stem and said lips into sealing contact with said cup and said restraining means, said restraining means comprising a plate extending a distance over the plug and removably secured to said cup, and said upper lip extending beyond the cup bore to be gripped between said plate and the cup, and said cup and said restraining means being formed to allow said stem to shift laterally relatively therein.

2. A valve comprising a body having a bore therein, a resilient member in the body bore having a bore therethrough and a circumferential external groove therearound within said body and a passageway transversely from the groove to the member bore, fluid admission means carried by the body to said groove, a rotatable plug in the resilient member bore having a passageway selectively registering with the resilient member passageway upon rotation of the plug, a bearing surface in the valve body against which the plug bears axially by its end, said plug being yieldingly supported laterally entirely by said resilient member.

3. A valve comprising a body having a bore therein, a resilient member in the body bore having a bore therethrough and a circumferential external groove therearound within said body and a passageway transversely from the groove to the member bore, fluid admission means carried by the body to said groove, a rotatable plug in the resilient member bore having a passageway selectively registering with the resilient member passageway upon rotation of the plug, a bearing surface in the valve body against which the plug bears axially by its end, said plug being yieldingly supported laterally entirely by said resilient member, said body having a counterbore at one end thereof carrying said surface, and the diameter of the counterbore exceeding the diameter of said plug to permit lateral shifting of the plug.

4. A valve comprising a body having a bore therein, a resilient member in the body bore having a bore therethrough and a circumferential external groove therearound within said body and a passageway transversely from the groove to the member bore, fluid admission means carried by the body to said groove, a rotatable plug in the resilient member bore having a passageway selectively registering with the resilient member passageway upon rotation of the plug, a bearing surface in the valve body against which the plug bears axially by its end, said plug being yieldingly supported laterally entirely by said resilient member, said body having a counterbore at one end thereof carrying said surface, and the diameter of the counterbore exceeding the diameter of said plug to permit lateral shifting of the plug, said resilient member being positioned against said end of said body bore to extend across that bore end and close off said counterbore about said plug.

THOMAS W. MULLEN.